US011965693B2

(12) United States Patent
Choi et al.

(10) Patent No.: US 11,965,693 B2
(45) Date of Patent: Apr. 23, 2024

(54) HELIUM GAS LIQUEFIER AND METHOD FOR LIQUEFYING HELIUM GAS

(71) Applicant: KOREA BASIC SCIENCE INSTITUTE, Daejeon (KR)

(72) Inventors: Yeon Suk Choi, Daejeon (KR); Myung Su Kim, Daejeon (KR)

(73) Assignee: KOREA BASIC SCIENCE INSTITUTE, Daejeon (KR)

( * ) Notice: Subject to any disclaimer, the term of this patent is extended or adjusted under 35 U.S.C. 154(b) by 578 days.

(21) Appl. No.: 17/126,036

(22) Filed: Dec. 18, 2020

(65) Prior Publication Data

US 2021/0199377 A1 Jul. 1, 2021

(30) Foreign Application Priority Data

Dec. 27, 2019 (KR) ........................ 10-2019-0177079

(51) Int. Cl.

*F25B 9/10* (2006.01)
*F17C 13/00* (2006.01)
*F25J 1/00* (2006.01)
*F25J 1/02* (2006.01)
*H01F 6/04* (2006.01)

(52) U.S. Cl.

CPC ........... *F25J 1/0007* (2013.01); *F17C 13/007* (2013.01); *F25B 9/10* (2013.01); *F25J 1/0237* (2013.01); *F25J 1/0279* (2013.01); *H01F 6/04* (2013.01); *F25B 2400/17* (2013.01); *F25J 2215/30* (2013.01); *F25J 2270/30* (2013.01); *F25J 2290/30* (2013.01)

(58) Field of Classification Search

CPC ...... F25J 1/0007; F25J 2270/912; F25B 9/14; F25B 9/002; F25B 2400/17; F25B 9/10; F17C 13/007; H01F 6/04; F04B 45/02

USPC ........................................................ 62/6, 51.1

See application file for complete search history.

(56) References Cited

U.S. PATENT DOCUMENTS

| | | | | |
|---|---|---|---|---|
| 4,499,737 A * | 2/1985 | Binnig | ...................... | F25B 9/12 62/610 |
| 8,375,742 B2 | 2/2013 | Wang | | |
| 2002/0002830 A1 * | 1/2002 | Strobel | ................ | F25D 19/006 62/51.1 |

(Continued)

FOREIGN PATENT DOCUMENTS

| | | |
|---|---|---|
| JP | 2004-286430 A | 10/2004 |
| JP | 2004-537026 A | 12/2004 |

(Continued)

OTHER PUBLICATIONS

Translation of JP2004-286430.*

*Primary Examiner* — John F Pettitt, III
*Assistant Examiner* — John F. Pettitt
(74) *Attorney, Agent, or Firm* — Nicholas Park

(57) ABSTRACT

Disclosed are a helium gas liquefier and a method for liquefying a helium gas. The disclosed helium gas liquefier includes: a first cooling part including a first cooling column; a first cold head installed on the first cooling column, and a first cylinder in which the first cooling column and the first cold head are built; a second cooling part including a second cooling column, a second cold head installed on the second cooling column, and a second cylinder in which the second cooling column and the second cold head are built; and a liquid helium storage disposed under the second cooling part.

6 Claims, 17 Drawing Sheets

(56) References Cited

U.S. PATENT DOCUMENTS

| | | | | |
|---|---|---|---|---|
| 2003/0230089 | A1* | 12/2003 | Strobel | F17C 13/00 62/51.1 |
| 2006/0021355 | A1* | 2/2006 | Boesel | F25D 19/00 62/51.1 |
| 2009/0324431 | A1* | 12/2009 | van Boeyen | F04B 45/02 417/375 |
| 2014/0202174 | A1* | 7/2014 | Wang | F25B 9/145 62/6 |
| 2018/0144852 | A1* | 5/2018 | Ito | F25B 9/14 |

FOREIGN PATENT DOCUMENTS

| | | | | |
|---|---|---|---|---|
| JP | 2015-124919 | A | | 7/2015 |
| JP | 2017031986 | A | * | 2/2017 |

* cited by examiner

HELIUM GAS LIQUEFIER AND METHOD FOR LIQUEFYING HELIUM GAS

CROSS-REFERENCE TO RELATED APPLICATION

This application claims priority to Korean Patent Application No. 10-2019-0177079 filed on Dec. 27, 2019 and all the benefits accruing therefrom under 35 U.S.C. § 119, the contents of which are incorporated by reference in their entirety.

BACKGROUND

The present disclosure relates to a helium gas liquefier for liquefying a helium gas by cooling the helium gas at an ultralow temperature and a method for liquefying a helium gas using the same.

Superconductive magnets operate at an ultralow temperature and a cooling solvent such as liquid helium is used to build operation environments for the superconductive coils. The boiling point of helium is approximately 4.2 K and helium is maintained at a liquid state only at an ultralow temperature lower than approximately 4.2 K.

In order to cool the superconductive magnets, a cryostat accommodating both liquid helium and a superconductive magnet is used. When liquid helium and a superconductive magnet are accommodated together in the cryostat, the superconductive magnet is cooled to an ultralow temperature by heat exchange between the liquid helium and the superconductive magnet. In this process, the heated liquid helium is vaporized and converted into gas helium.

Liquid helium is difficult to prepare and therefore belongs to a very expensive solvent. At present, the market price of liquid helium is approximately 40-50 thousand won per liter and corresponds to very expensive price compared to other cooling solvent. Thus, it is being recognized as an import research problem to efficiently produce liquid helium.

PRIOR ART DOCUMENT

Patent Document

U.S. patent publication No. 2014/0202174A1

SUMMARY

In accordance with an aspect, there is disclosed a helium gas liquefier. The helium gas liquefier includes: a first cooling part including a first cooling column; a first cold head installed on the first cooling column, and a first cylinder in which the first cooling column and the first cold head are built; a second cooling part including a second cooling column, a second cold head installed on the second cooling column, and a second cylinder in which the second cooling column and the second cold head are built; and a liquid helium storage disposed under the second cooling part, wherein a plurality of radially formed fins are formed on an outer circumferential surface of at least one among the second cooling column and the second cold head.

The helium gas liquefier may further include a plurality of fins formed on a surface of the second cold head toward the liquid helium storage from the second cold head.

The first cylinder may include wrinkles formed on a surface thereof and may be flexible in a lengthwise direction thereof.

The helium gas liquefier may further include a flange configured to connect the first cold head and the second cooling column, wherein the flange may include therein a pass hole through which a helium gas passes, and the pass hole may be formed in a position adjacent to an edge of the first cold head.

The helium gas liquefier may further include a radiation shield configured to accommodate the second cooling part and the liquid helium storage; and a chamber configured to accommodate the first cooling part and the radiation shield.

The helium gas liquefier may further include an insulating shield body disposed on a surface of the radiation shield and including a plurality of insulating shield layers.

The helium gas liquefier may further include: an ultralow temperature cooling part disposed under the liquid helium storage and configured to receive liquid helium stored in the liquid helium storage and perform a cooling function; and a first hose through which the helium gas vaporized in the ultralow temperature cooling part passes.

The helium gas liquefier may further include a purifier connected to the first hose between a compressor and the liquid helium storage.

The helium gas liquefier may further include: a compressor configured to increase a pressure of a helium gas supplied from the helium gas supply part; and a second hose connected to the compressor and configured to cause the helium gas discharged from the compressor to be injected into the first cylinder, wherein the compressor may be connected to the first hose.

The compressor may include: a first storage configured to accommodate the helium gas supplied from the helium gas supply part and connected to the second hose; and a second storage in which the first storage is built and which is connected to the first hose and to the second hose.

The compressor may further include a first mass body provided in an entrance connected to the first hose of the second storage.

The compressor may further include a second mass body provided in an entrance connected to the second hose of the first storage.

The compressor may further include a third mass body provided in an entrance connected to the second hose of the second storage.

At least a portion of the first hose may make contact with the surface of the radiation field.

At least a portion of the first hose may be wound on the radiation shield.

In accordance with another aspect, there is disclosed a method for liquefying a helium gas. The disclosed method includes: injecting a helium gas into a first cooling part including a first cooling column; a first cold head installed on the first cooling column, and a first cylinder in which the first cooling column and the first cold head are built; cooling the helium gas in the first cooling part; cooling the helium gas in a second cooling part including a second cooling column, a second cold head installed on the second cooling column, and a second cylinder in which the second cooling column and the second cold head are built; and storing liquefied helium in a liquid helium storage, wherein a plurality of radially formed fins are formed on an outer circumferential surface of at least one among the second cooling column and the second cold head.

A plurality of fins that are radially formed may be formed on at least one outer circumferential surface in the second cooling column 122 and the second cold head 124.

The method may include circulating the helium gas vaporized in the liquid helium storage and re-injecting the helium gas into the first cooling part.

The method may further include transferring, to a compressor, the helium gas circulated through the first hose and the helium gas supplied from the helium gas supply part; and adjusting a pressure of the helium gas in the compressor.

The method may further include pre-cooling a gas passing through the first hose in a region in which the first hose makes contact with the surface of the radiation field configured to accommodate the second cooling part and the liquid helium storage.

The method may further include removing impurities inside the first hose using a purifier connected to the first hose.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Specific structural or functional descriptions on exemplary embodiments are merely for exemplification and the embodiments may be implemented by being modified into various forms. Thus, exemplary embodiments are not limited to specific disclosed forms, and the scope of the present description includes modification, equivalents, or replacements included in the technical concepts.

The terms such as "first" or "second" may be used to describe various elements, but such terms should be interpreted only for discriminating one element from other elements. For example, a first element may be referred to as a second element. Likewise, the second element may also be referred to as the first element.

It should also be understood that when an element is referred to as being "'connected to" another element, it can be directly connected to another element, but an intervening element may also be present therebetween.

Singular forms may include plural forms unless clearly defined otherwise in context. The meaning of 'include' or 'have' specifies a feature, a number, a step, an operation, an element, a component, or a combination thereof, but should not be construed as excluding in advance the presence or the possibility of adding other features, numbers, steps, operations, elements, components, combinations thereof.

Unless terms used in the present disclosure are defined differently, the terms including technological or scientific terms may be construed to be the same as meanings generally known to those skilled in the art. Terms such as terms that are generally used and have been in dictionaries should be construed as having meanings matched with contextual meanings in the art. In this description, unless defined clearly, terms are not ideally, excessively construed as formal meanings.

Hereinafter, embodiments will be described in detail with reference to accompanying drawings. In describing with reference to the accompanying drawings, like elements are referred to by like reference symbols, and overlapped description thereon will be omitted.

Figure 1:
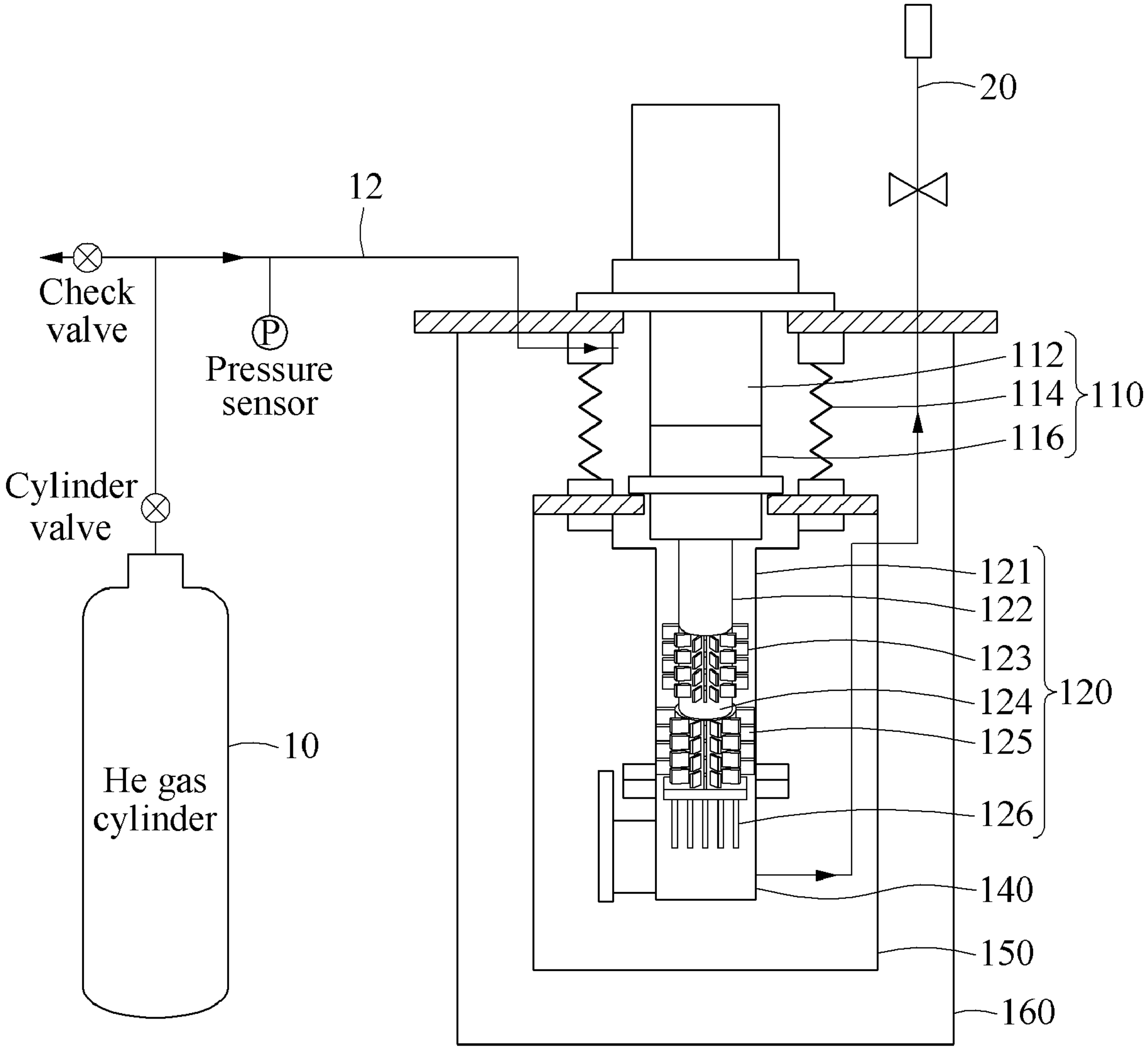
FIG. 1 is a cross-sectional view illustrating a helium gas liquefier in accordance with an exemplary embodiment.

FIG. 1 is a cross-sectional view illustrating a helium gas liquefier in accordance with an exemplary embodiment.

Referring to FIG. 1, a helium gas liquefier may include a first cooling part 110, a second cooling part 120, and a helium storage 140 disposed below the second cooling part 120.

A helium gas supply part 10 may store a helium gas. The helium gas stored in the helium gas supply part 10 may be injected into the first cooling part 110 through a supply hose 12.

The first cooling part 110 may include a first cooling column 112, a first cold head 116 installed at an end of the first cooling column 112, and a first cylinder 114 in which the first cold head 116, the first cooling column and the first cold head 116 are built. The first cooling part 110 may be maintained at a low temperature by the first cold head 16. Since the first cooling column 112 and the first cold head 116 are built in the first cylinder 114, the inside of the first cooling part 110 may be shielded by the first cylinder 114.

The helium gas injected through the supply hose 12 may be injected into the first cylinder 114. The helium gas injected into the first cylinder 114 may be cooled by heat exchange with the first cooling part 110. For example, the helium gas may be cooled to approximately 36 K by the first cooling part 110.

Wrinkles may be formed in at least a portion of the surface of the first cylinder 114. That is, the first cylinder 114 may have a bellows shape. Since the first cylinder 114 has a bellows shape, the first cylinder 114 may be flexible in the lengthwise direction thereof. As the helium gas liquefier changes from an operation state into a non-operation state or from a non-operation state into an operation state, the temperature of the first cooling part 110 may vary. Since the first cylinder 114 is flexible in the lengthwise direction, the first cylinder 114 may not be damaged due to contraction or expansion even when the temperature of the first cooling part 110 varies.

The helium gas cooled in the first cooling part 110 has an increased density and may move to the second cooling part 120 by convection.

The second cooling part 120 may include a second cooling column 122, a second cold head 124 installed at an end of the second cooling column 122, and a second cylinder 121 in which the second cold head 124, the second cooling column 122 and the second cold head 124 are built. The second cooling part 124 may be maintained at a low temperature in the second cold head 16. Since the second cooling column 122 and the second cold head 124 are built in the second cylinder 121, the inside of the second cooling part 120 may be shielded by the first cylinder 121.

The diameter of the second cylinder 121 may be smaller than the diameter of the first cylinder 114. In addition, the diameter of the second cooling column 122 may be smaller than the diameter of the first cooling column 112. Thus, the helium gas is concentrated in a relatively narrow space and an efficient heat exchange may occur. The helium gas may be cooled to approximately 4 K in the second cooling part 120. The helium gas cooled to a boiling point of helium or lower may be liquefied and move to the liquid helium storage 140.

A plurality of fins that are radially formed may be formed on at least one outer circumferential surface in the second cooling column 122 and the second cold head 124. For example, a plurality of first fins 123 may be formed on at least a portion in the outer circumferential surface of the second cooling column 122. In addition, a plurality of second fins 125 may be formed on at least a portion in the outer circumferential surface of the second cold head 124. FIG. 1 illustrates that a plurality of fins are formed both on the outer circumferential surface of the second cooling column 122 and the outer circumferential surface of the second cold head 124, but the embodiments are not limited thereto. For example, a plurality of fins may also be formed only on one among the outer circumferential surface of the second cooling column 122 and the outer circumferential surface of the second cold head 124. In addition, a plurality of fins may also be formed on the outer circumferential surface of the first cooling column 112 or on the outer circumferential surface of the first cold head 116.

Figure 2:
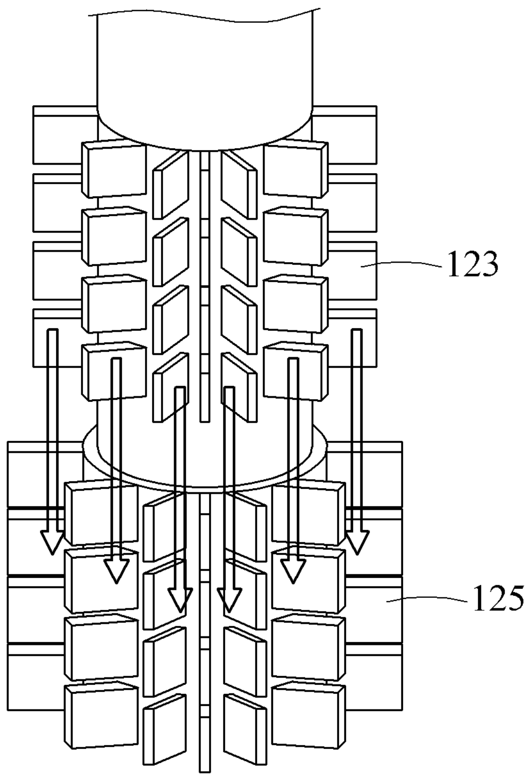
FIG. 2 is a view illustrating a first fin and a second fin illustrated in FIG. 1.

FIG. 2 is a view illustrating first fins 123 and second fins 125 illustrated in FIG. 1.

Referring to FIG. 2, the first fins 123 may be radially formed on the outer circumferential surface of the second cooling column 122. In addition, the plurality of second fins 125 may be radially formed on the outer circumferential surface of the second cold head 124. The first fins 123 and the second fins 125 may include a metal having high heat conductivity. For example, the first fins 123 and the second fins 125 may include aluminum or copper, but the embodiments are not limited thereto. FIG. 2 illustrates cross-sections of the first fins 123 and the second fins 125 in rectangles, but the embodiments are not limited thereto. For example, the cross-sections of the first fins 123 and the second fins 125 may also be polygons, ellipses or circles which are not rectangles.

While the helium gas moves downward due to convection, the helium gas may make contact with the first fins 123 and the second fins 125. While moving downward, the helium gas makes contact with the first fins 123 and the second fins 125, and therefore the heat exchange area may increase. Thus, the helium gas may effectively be cooled.

Referring again to FIG. 1, the second cooling part 120 may further include a plurality of third fins 126 which is formed toward the liquid helium from the second cold head 124 on the bottom surface of the second cold head 124. The second fins 125 and the third fins 126 may be thermally connected to the second cold head 124. Thus, the second fins 125 and the third fins 126 may be maintained at a low temperature while the second cold head 124 is maintained at a low temperature. The area in which helium gas is subjected to heat exchange may further be increased by the second fins 125 and the third fins 126. Thus, the helium gas may effectively be cooled.

The helium gas liquefier may further include a radiation shield 150 that accommodates the second cooling part 120 and the liquid helium storage 140. The radiation shield 150 may be thermally connected to the first cooling part 110. Thus, the radiation shield 150 may be maintained at a low temperature state by heat exchange with the first cooling part 110. For example, while the helium gas liquefier operates, the radiation shield 150 may be maintained at a temperature of the boiling point (approximately 77K or lower) of nitrogen. Since the radiation shield 150 is maintained at a low temperature, transfer of heat outside the radiation shield 150 into the inside of the radiation shield 150 may be prevented by the radiation shield 150. That is, sine the inside of the radiation shield 150 is maintained at a low temperature, the liquefaction rate of helium gas increases in the second cooling part 120 and the amount of liquefied helium in the liquid helium storage 140 may decrease.

The helium gas liquefier may further include a chamber 160 that accommodates the first cooling part 110 and the radiation shield 150. The inside of the chamber 160 may be maintained to be close to vacuum. Thus, the amount of heat transferred to the radiation shield 150 from outside the chamber 160. The liquid helium storage 140 may store liquefied helium. A portion of the liquefied helium may be vaporized. In this process, the helium gas may be discharged to the outside due to convention through a discharge hose 20.

Figure 3:
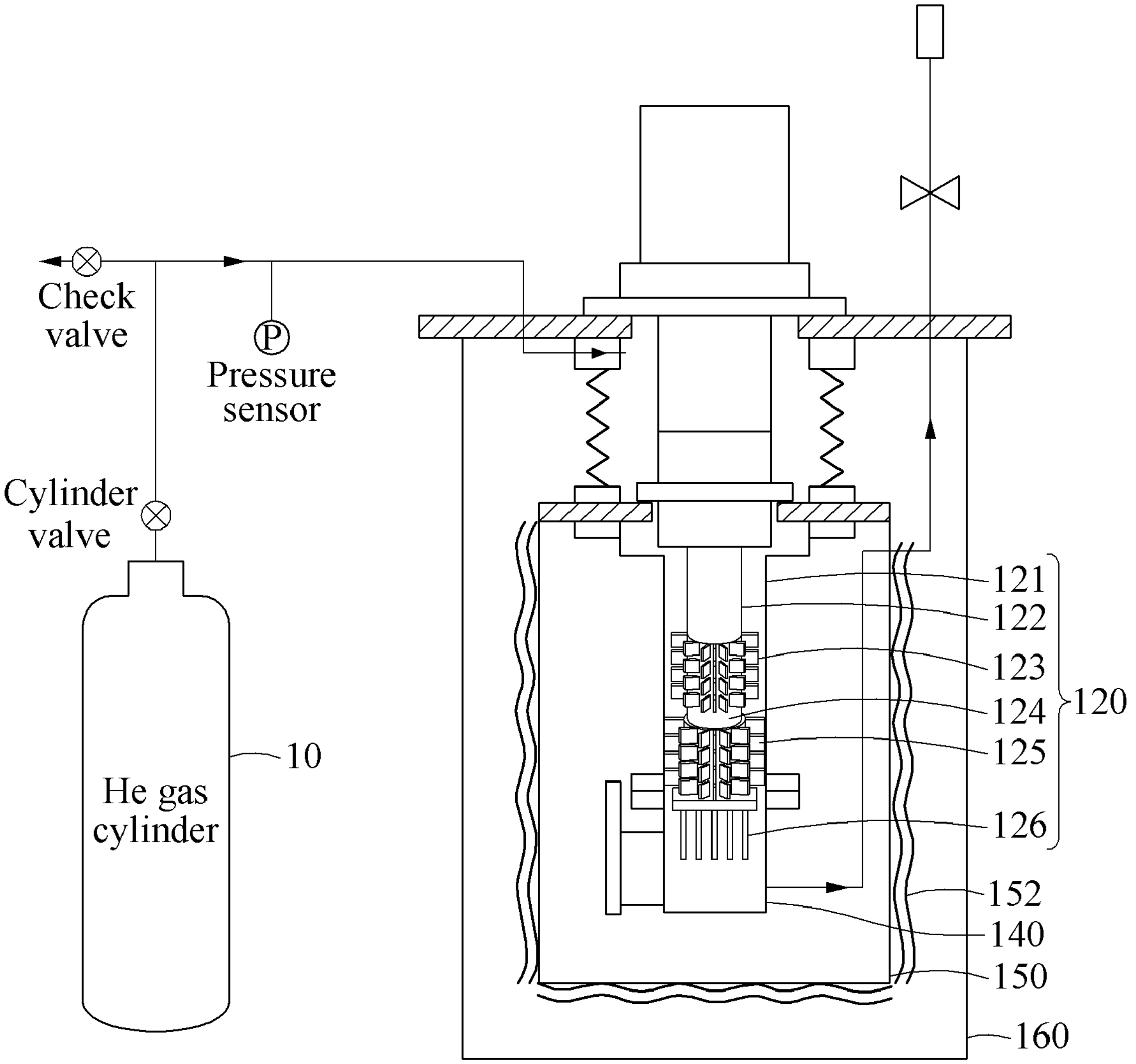
FIG. 3 is a cross-sectional view illustrating a helium gas liquefier in accordance with another exemplary embodiment.

FIG. 3 is a cross-sectional view exemplarily illustrating a helium gas liquefier in accordance with another exemplary embodiment. In describing the embodiment of FIG. 3, the content overlapping with FIG. 1 will be omitted.

Referring to FIG. 3, the helium gas liquefier may include an insulating shield body 152 that is disposed on the surface of the radiation shield 150 and includes multi layer insulation (MLI). The amount of heat exchange occurring on the surface of the radiation shield 150 due to the insulating shield body 152 may decrease. That is, since the inside of the radiation shield 150 is maintained at a low temperature, the liquefaction rate of helium gas increases in the second cooling part 120 and the mount of helium vaporized in the liquid helium storage 140.

Figure 4:
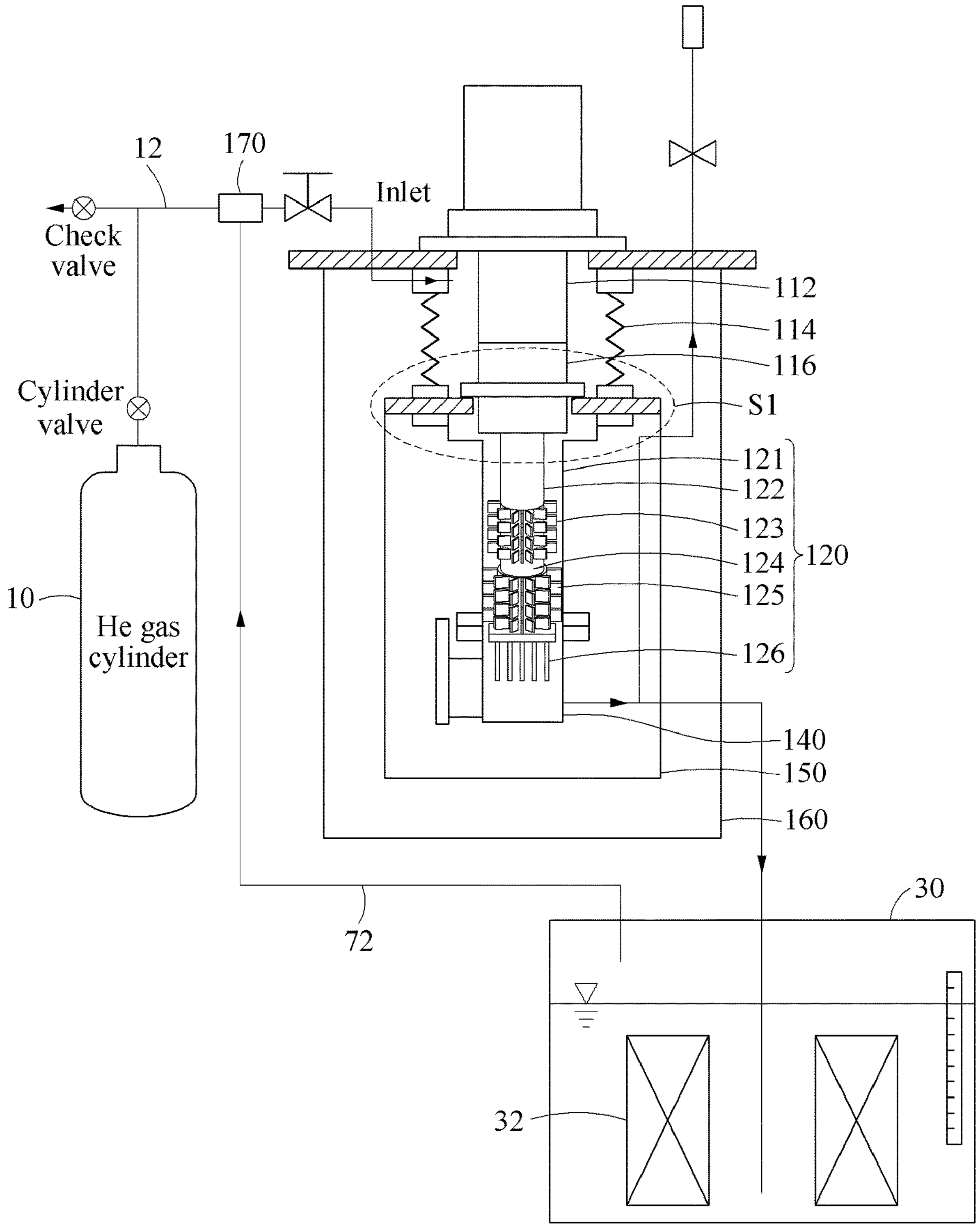
FIG. 4 is a cross-sectional view illustrating a helium gas liquefier in accordance with another exemplary embodiment.

FIG. 4 is a cross-sectional view exemplarily illustrating a helium gas liquefier in accordance with another exemplary embodiment. In describing the embodiment of FIG. 4, the content overlapping with FIGS. 1 to 3 will be omitted.

Referring to FIG. 4, a helium gas liquefier may include an ultralow temperature cooling part 30 which is disposed under a liquid helium storage 140 and performs a cooling function by receiving the liquid helium stored in the liquid helium storage 140. The liquid helium stored in the liquid helium storage 140 may move to the ultralow temperature cooling part 30 through a hose. Since the ultralow temperature cooling part 30 is located below the liquid helium storage 140, liquid helium may move to the ultralow temperature cooling part 30 by gravitational force without other power.

The ultralow temperature cooling part 30 may use liquid helium to perform a cooling function. For example, the ultralow temperature cooling part 30 may cool a superconductive magnet 32 using ultralow temperature liquid helium.

The helium gas vaporized in the ultralow temperature cooling part 30 may be recovered through a first hose 72. Since the vaporized helium gas rises due to natural convention, the helium gas may be circulated through the first hose 72 without external power. Since not using external power, power consumption may be decreased and occurrence of vibration due to an external power source may be prevented.

The helium gas may be transferred to a compressor 170 through the first hose 72. The compressor 170 may be connected to a supply hose 12 and the first hose 72. The compressor 170 may adjust the pressure of the helium gas supplied through the supply hose 12 and the helium gas transferred through the first hose 72, and cause the helium gas to be injected into a first cooling part 110 at a predetermined pressure.

The helium gas may be cooled by heat exchange with a first cooling column 112 and a first cold head 116 in the first cooling part 110. The closer, to the first cooling column 112 and the first cold head 116, a path through which helium gas passes in the first cooling part 110, the higher the cooling efficiency may be. Thus, the closer, to each other, the inner circumferential surface of a first cylinder 114, and the outer circumferential surface of the first cooling column 112 and the outer circumferential surface of the first cold head 116, the higher the cooling efficiency of the first cooling part 110 may be.

Figure 5A:
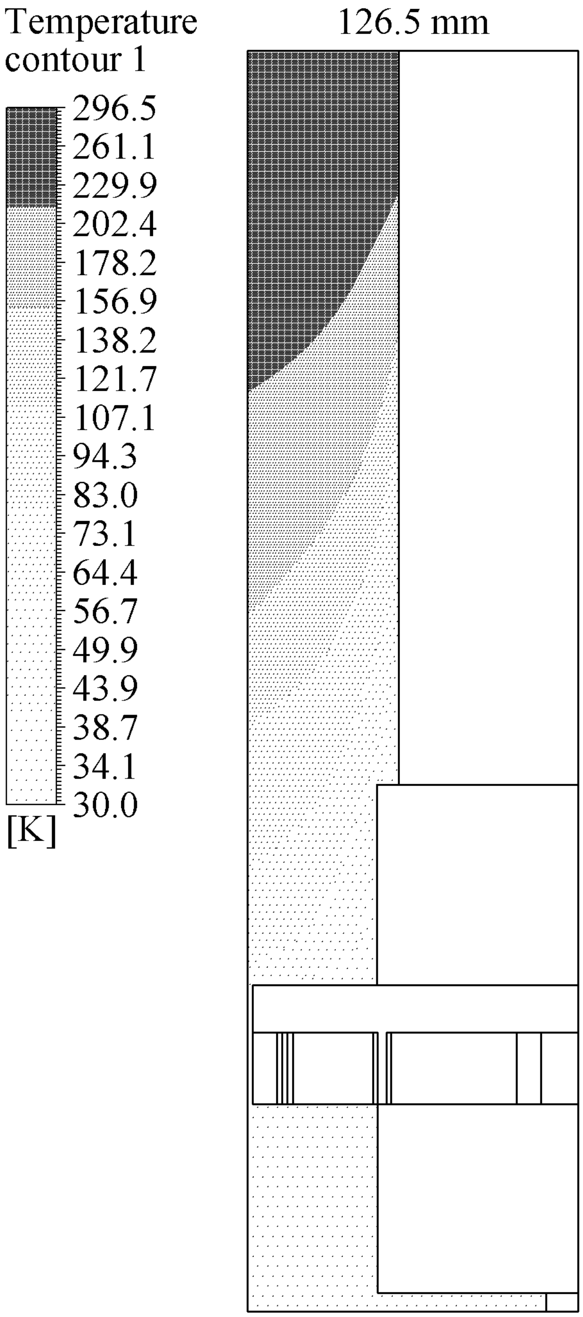
FIGS. 5A-5C are views illustrating a change in a temperature distribution inside a first cylinder according to gaps between an inner circumferential surface of the first cylinder, an outer circumferential surface of the first cylinder, and an outer circumferential surface of a first cold head.
Figure 5B:
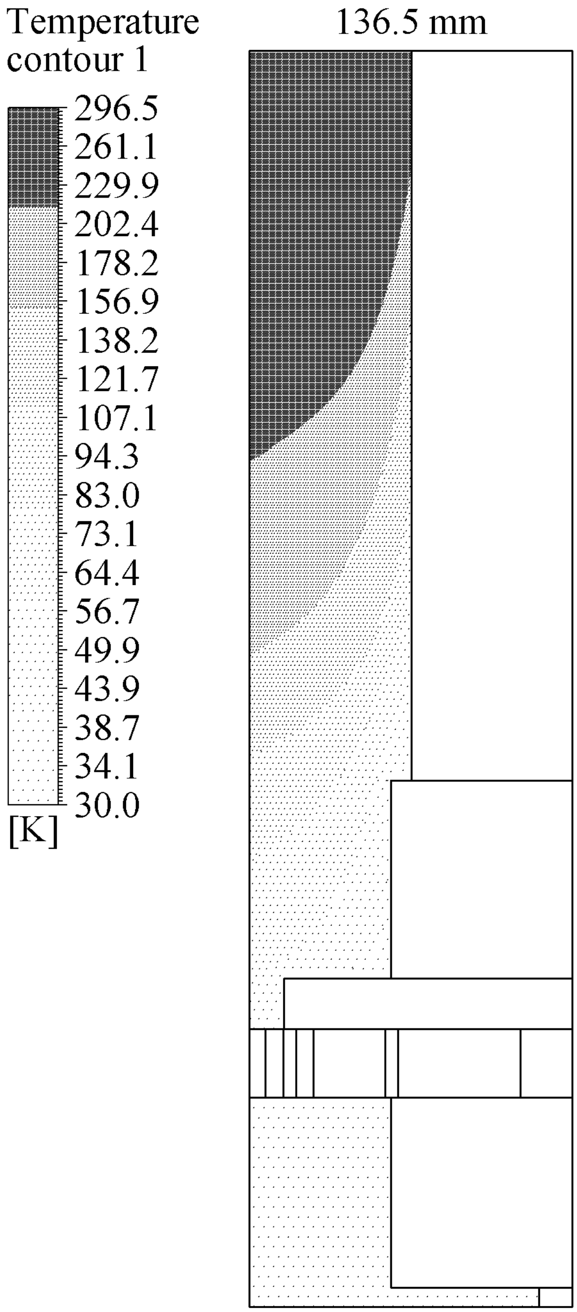
Figure 5C:
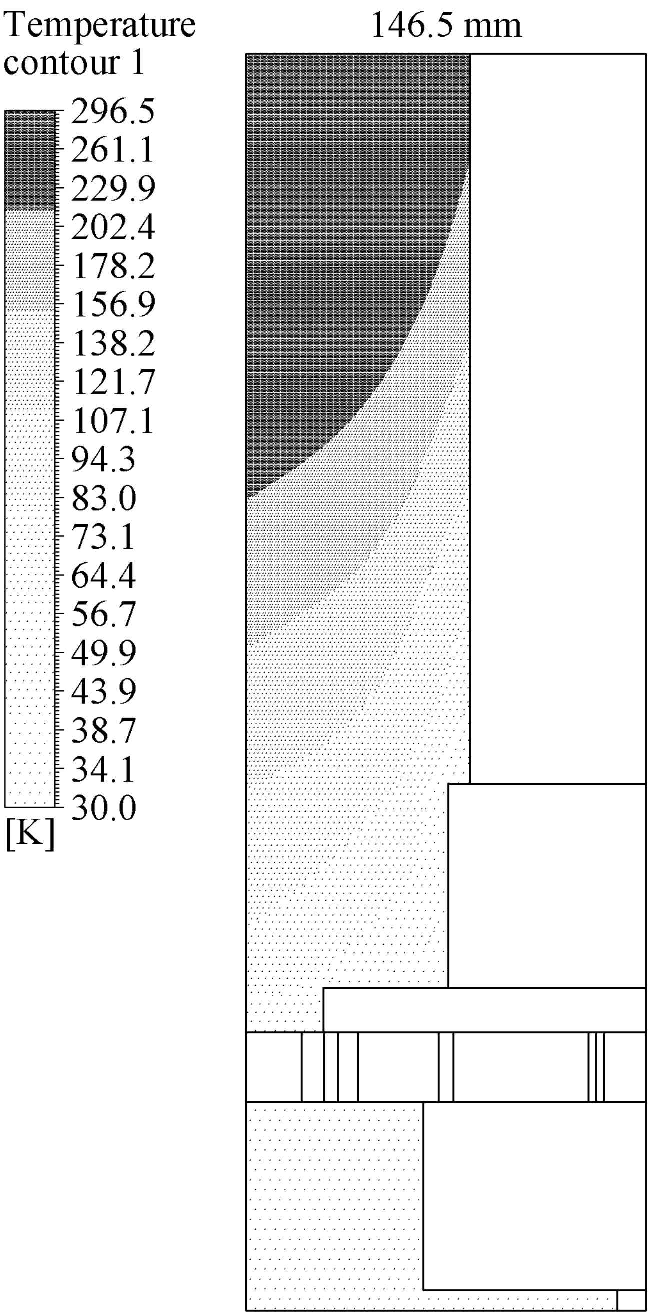

FIGS. 5A-5C are views illustrating a change in the temperature distribution inside the first cylinder 114 according to gaps between an inner circumferential surface of the first cylinder 114, an outer circumferential surface of the first cooling column 112, and an outer circumferential surface of the first cold head 116. FIG. 5A illustrates a case in which the gap is approximately 126.5 mm, FIG. 5B illustrates a case in which the gap is approximately 136.5 mm, and FIG. 5C illustrates a case in which the gap is approximately 146.5 mm.

Referring to FIGS. 5A-5C, the greater the gap between the inner circumferential surface of the first cylinder 114, the outer circumferential surface of the first cooling column 112, and the outer circumferential surface of the first cold head 116, the higher the temperature of helium gas inside the first cylinder 114 may be. As the gap increases, the temperature of the helium gas transferred from the first cooling part 110 to the second cooling part 120 increases and thus, the liquefaction rate of helium gas may decrease. On the contrary, as the gap decreases, the temperature of the helium gas transferred from the first cooling part 110 to the second cooling part 120 decreases, and thus, the liquefaction rate of helium gas may increase.

Figure 6:
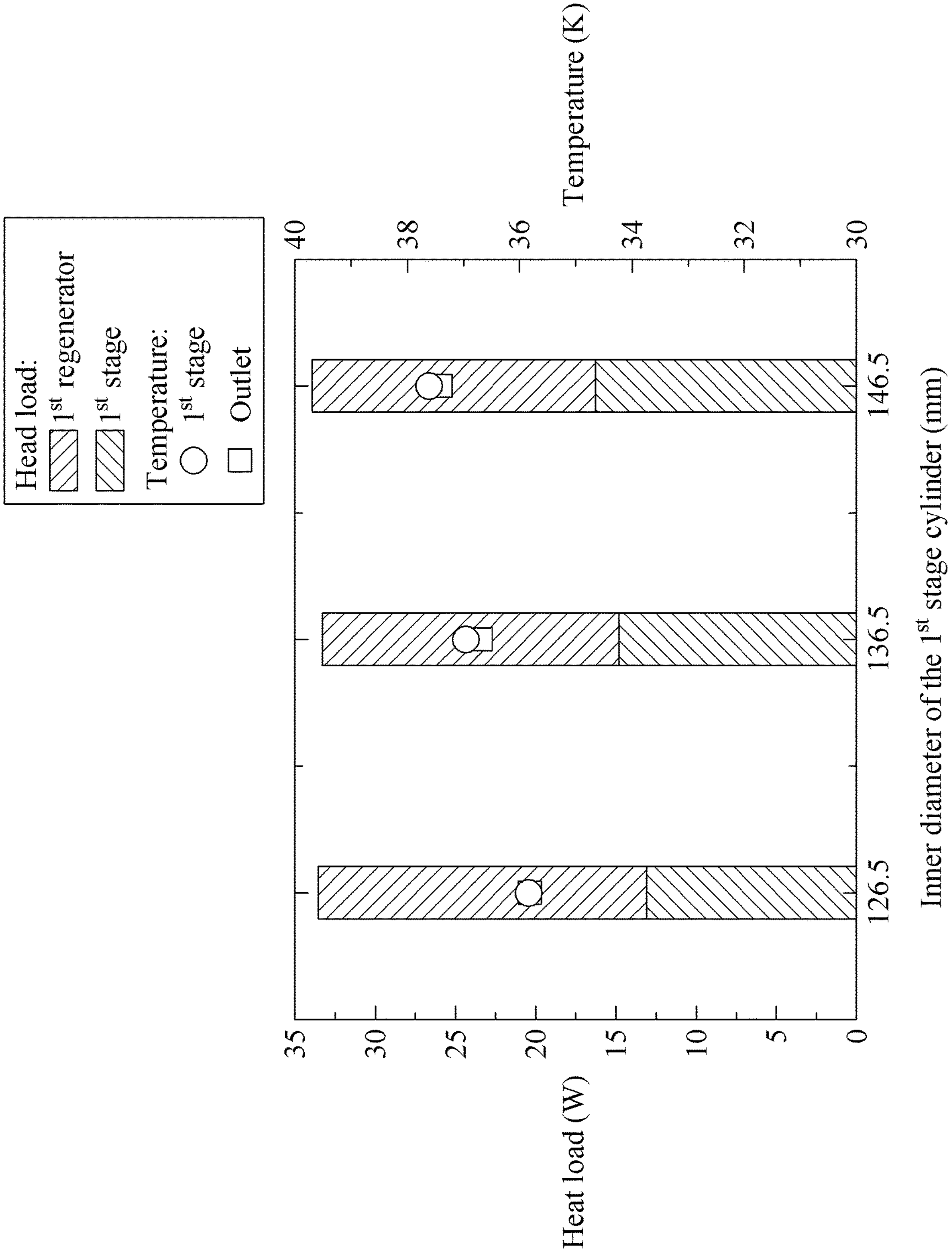
FIG. 6 is a graph illustrating a heat load and a change in the temperature of helium gas discharged from a first cooling part to a second cooling part according to gaps between the inner circumferential surface of the first cylinder, the outer circumferential surface of the first cylinder, and the outer circumferential surface of a first cold head.

FIG. 6 is a graph illustrating the heat load of the first cooling part 110 and a change in the temperature of helium gas discharged to the second cooling part from the first cooling part 110 according to the gap between the inner circumferential surface of the first cylinder 114, the outer circumferential surface of the first cooling column 112, and the outer circumferential surface of the first cold head 116. The x-axis of the graph represents the gap, and the y-axis represents the heat load and the temperature of helium gas discharged from the first cooling part 110.

Referring to FIG. 6, as the gap increases, the temperature of the helium gas transferred from the first cooling part 110 to the second cooling part 120 increases, and the heat load of the first cooling part may also increase. For example, when the gap is approximately 126.5 mm, the temperature of helium gas may be approximately 20 K, when the gap is approximately 136.5 mm, the temperature of the helium gas may be approximately 24 K, and when the gap is approximately 146.5 mm, the temperature of the helium gas may be approximately 27 K. According to description with reference to FIGS. 5 and 6, the smaller the gap between the inner circumferential surface of the first cylinder 114, the outer circumferential surface of the first cooling column 112, and the outer circumferential surface of the first cold head 116, the higher the liquefaction rate of the helium gas may be.

Figure 7:
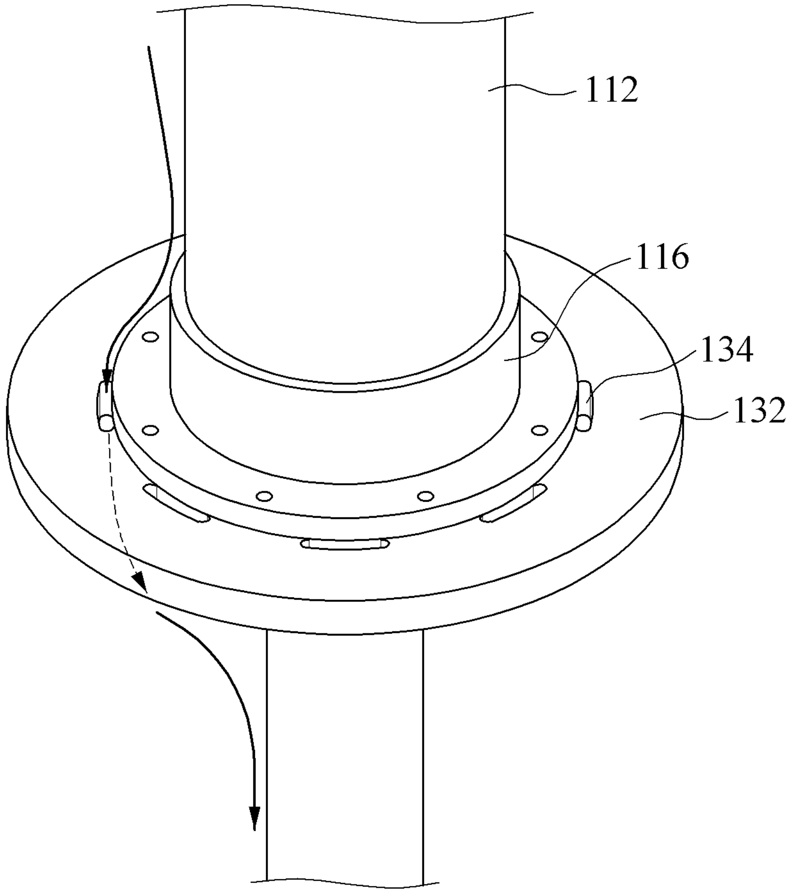
FIG. 7 is an expanded view of region S1 of FIG. 4.

FIG. 7 is an expanded view of region S1 of FIG. 4.

Referring to FIG. 7, a flange 132 may be prepared between the first cold head 116 and the second cooling column 122. In the flange 132, at least one pass hole 134 through which helium gas of the first cooling part 110 moves to the second cooling part 120 may be formed. The pass hole 134 may be located in the inner region of the first cylinder 114. The pass hole 134 may be formed in a position adjacent to the edge of the first cold head 116. The first cylinder 114 may be connected to the flange 132 in a region adjacent to the pass hole 134. Since the edge of the first cold head 116 and the pass hole 134 are adjacent to each other, the gap between the inner circumferential surface of the first cylinder 114 and the outer circumferential surface of the first cold head 116 may decrease. That is, the gap between the inner circumferential surface of the first cylinder 114, the outer circumferential surface of the first cooling column 112, and the outer circumferential surface of the first cold head 116 may decrease. Thus, the liquefaction rate of helium gas may increase.

Figure 8:
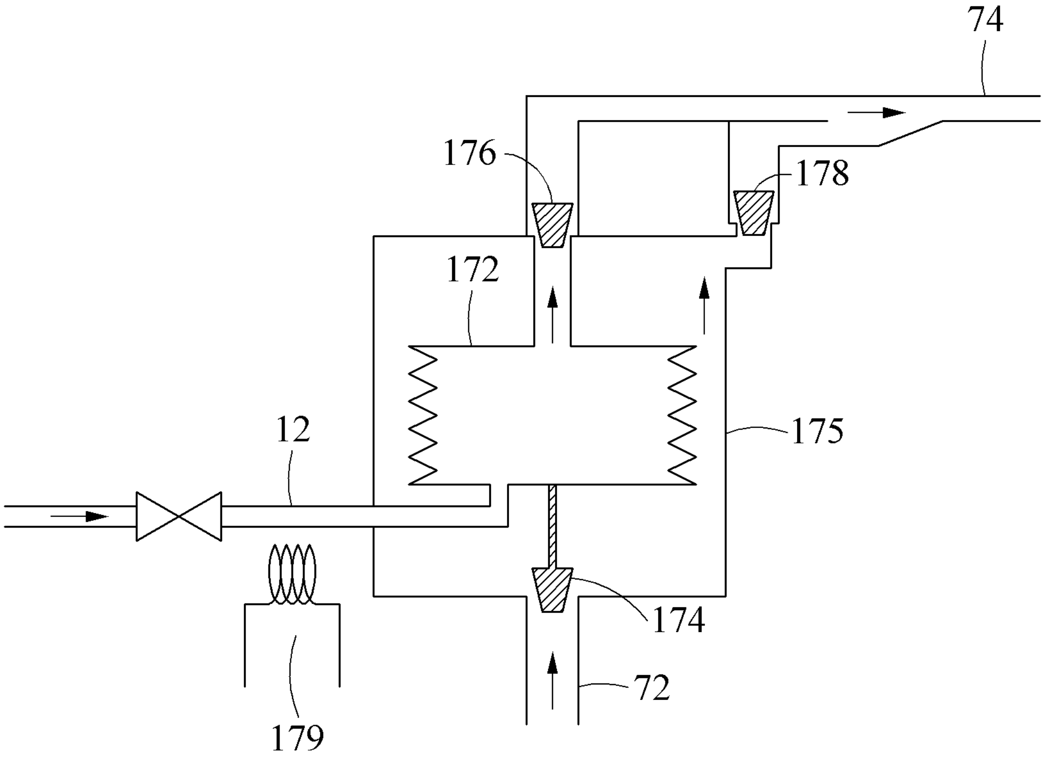
FIG. 8 is a conceptual view exemplarily illustrating a compressor illustrated in FIG. 7.

FIG. 8 is a conceptual view exemplarily illustrating the compressor 170 illustrated in FIG. 7.

Referring to FIG. 8, the compressor 170 may adjust the pressure of the helium gas supplied from the helium gas supply part 10 through the supply hose 12. The compressor 170 may be connected to a second hose 74. The helium gas discharged from the compressor 170 may be injected into the first cylinder 114 through the second hose 74. The compressor 170 may be connected to the first hose 72. The helium gas vaporized in the ultralow temperature cooling part 30 may be transferred to the compressor 170 through the first hose 72. The compressor 170 may adjust the pressure of the helium gas transferred through the first hose 72.

The compressor 170 may raise the pressure of the helium gas transferred through the second hose 74. The melting point of helium may vary according to pressure. The higher the pressure of helium gas, the higher the melting point of helium gas may be. The higher the pressure of helium gas, the lower the boiling point of the helium gas and the higher the liquefaction rate of the helium gas.

Figure 9:
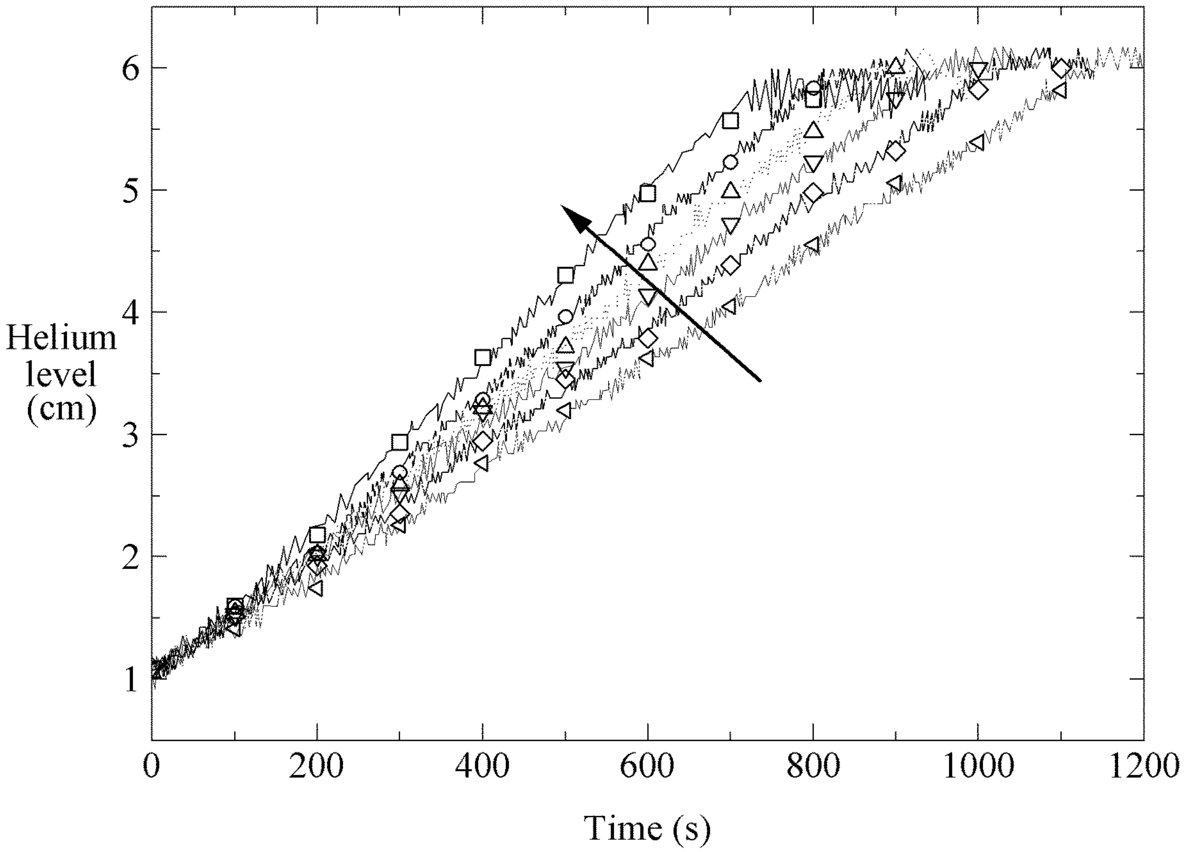
FIG. 9 is a graph illustrating differences between liquefied amounts of helium over time according changes in the pressure of a helium gas.

FIG. 9 is a graph illustrating differences between liquefied amounts of helium over time according changes in the pressure of a helium gas. In FIG. 9, the horizontal axis represents cooling time and the vertical axis represents the amount of liquefied helium. The plurality of graphs illustrated in FIG. 9 represents helium gases having mutually different pressures.

Referring to FIG. 9, the higher the pressure of helium gas, the greater the slope of the graph may be. That is, the higher the pressure of helium gas, the greater the amount of helium liquefied per time and the higher the liquefaction rate of the helium gas may be.

Figure 10A:
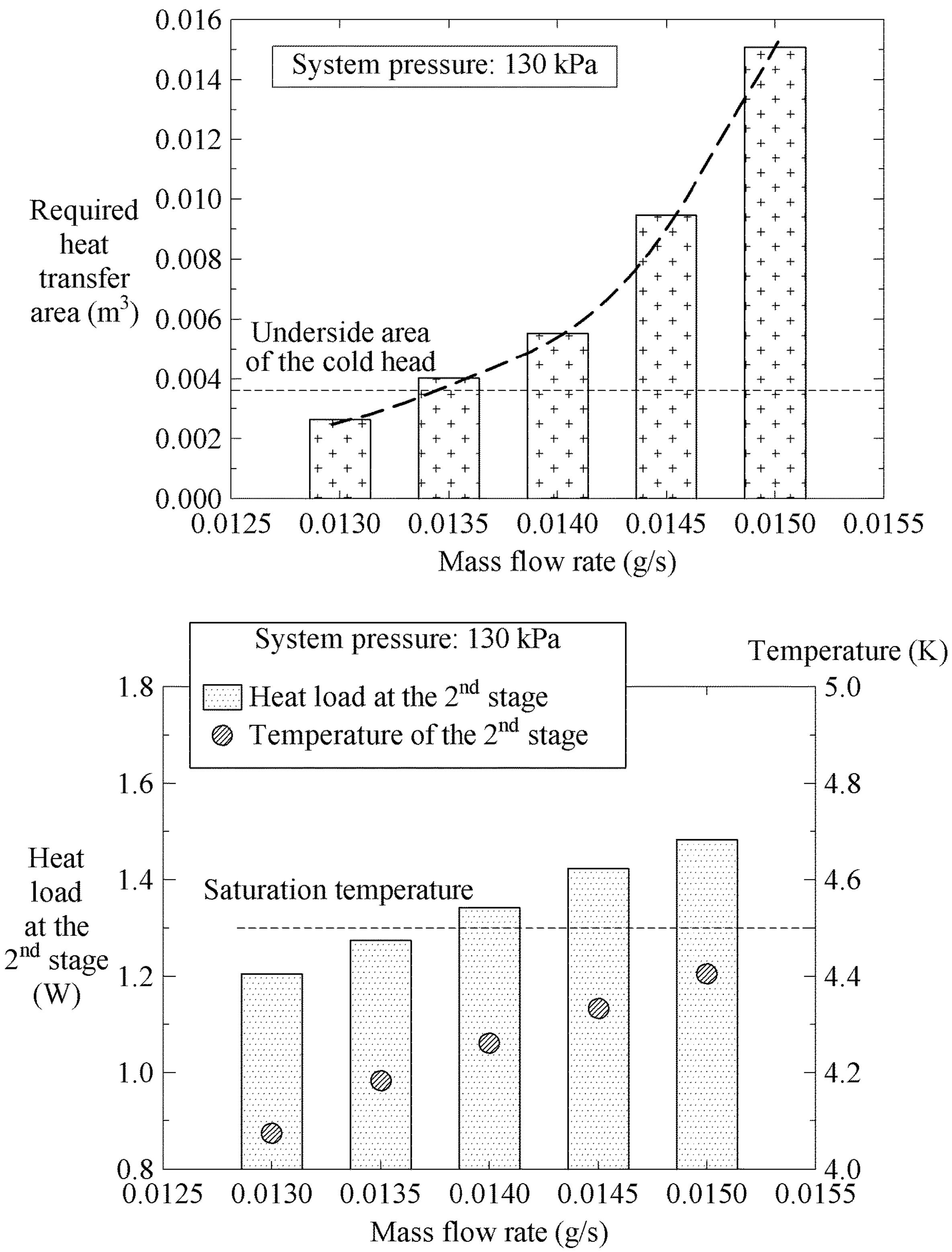
FIGS. 10A-10C are graphs for describing relationship between the pressure of helium gas and the liquefaction rate of helium gas.
Figure 10B:
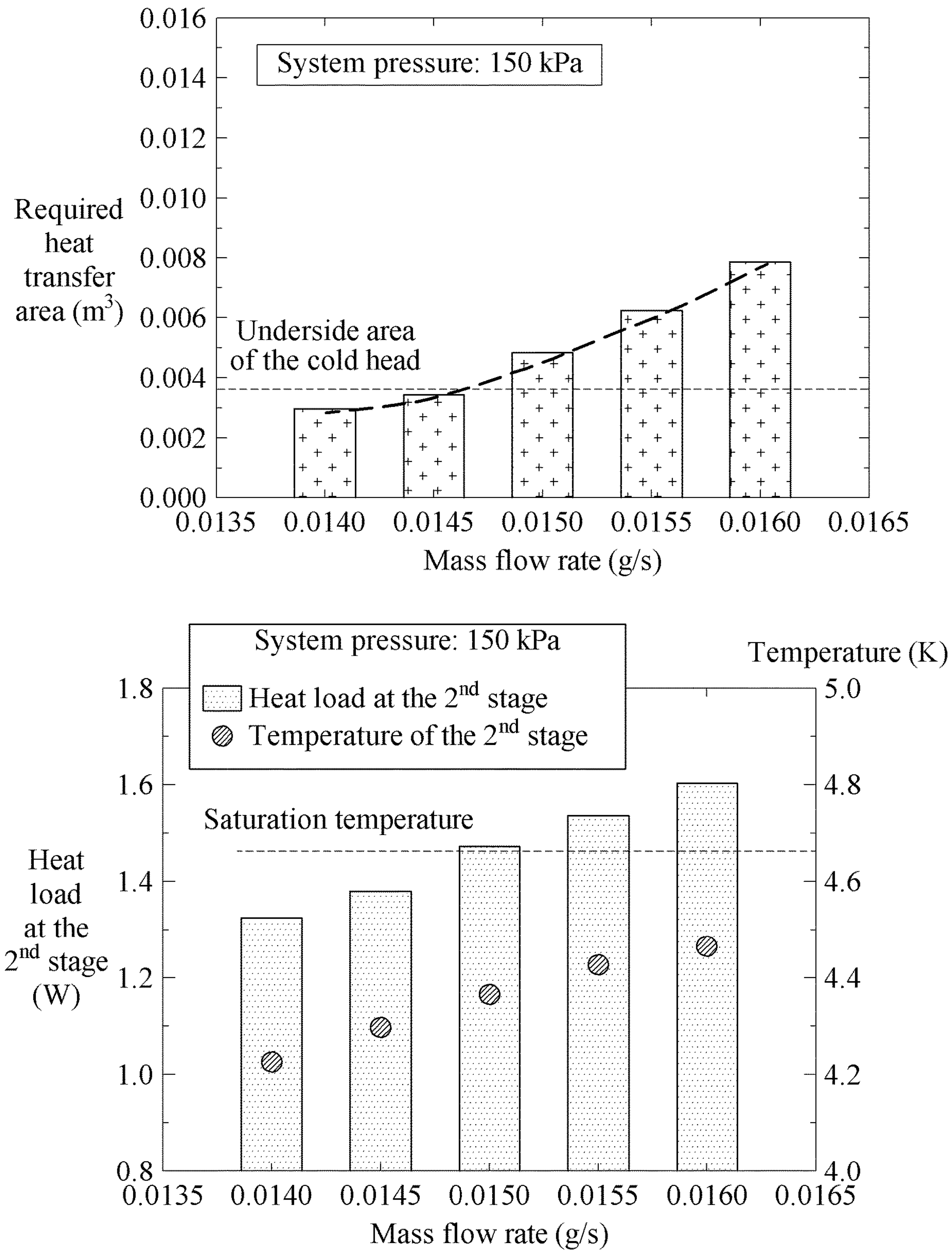
Figure 10C:
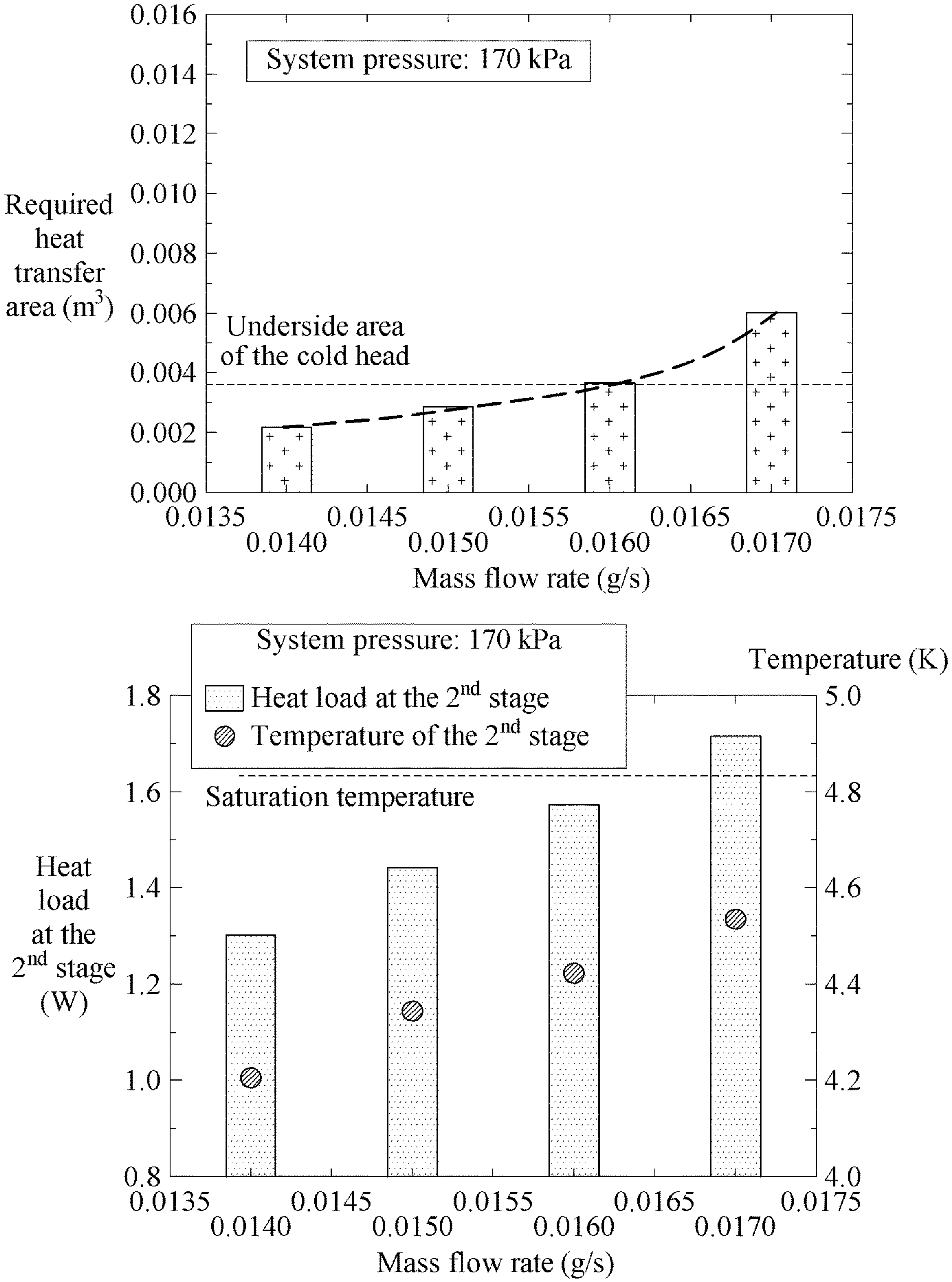

FIGS. 10A-10C are graphs for describing relationship between the pressure of helium gas and the liquefaction rate of helium gas.

In FIGS. 10A-10C the graphs on the upper side represent the relationship between the mass flowrate of helium gas and the heat exchange cross-sectional area required for liquefaction of the helium gas. In FIGS. 10A-10C, the graphs on the lower side represent the mass flowrate of helium gas, the heat load of the second cooling part 120, the temperature of the second cooling part 120, and the boiling point of the helium gas. FIG. 10A illustrates a case in which the pressure of the helium gas is approximately 130 kPa, FIG. 10B illustrates a case in which the pressure of the helium gas is approximately 150 kPa, and FIG. 10C illustrates a case in which the pressure of the helium gas is approximately 170 kPa.

Referring to FIGS. 10A-10C, the required heat exchange area may increase because a great amount of helium gas is introduced as the mass flowrate of the helium gas increases. However, the higher the pressure of the helium gas, the greater the mass flowrate of the helium gas that can liquefy the helium gas with the same heat exchange cross-sectional area. For example, when the pressure of the helium gas is approximately 130 kPa with respect to a predetermined heat exchange cross-sectional area, the mass flowrate of the helium gas that can be liquefied may be less than approximately 0.0135 g/s. However, when the pressure of the helium gas is approximately 150 kPa with respect to the same heat exchange cross-sectional area, the mass flowrate of the helium gas that can be liquefied may be approximately 0.0145 kPa. In addition, when the pressure of the helium gas is approximately 170 kPa with respect to the same heat exchange cross-sectional area, the mass flowrate of the helium gas that can be liquefied may be approximately 0.0160 kPa.

The greater the mass flowrate of the helium gas, the higher the heat load of the second cooling part 20 and the temperature of the second cooling part 120 may be. The higher the pressure of the helium gas, the higher the boiling point of the helium gas, and thus, the helium gas liquefier may deal with the higher mass flowrate of the helium gas. For example, when the pressure of the helium gas is approximately 130 kPa, the temperature of the second cooling part 120 approaches the boiling point of the helium gas when the mass flowrate of the helium gas reaches approximately 0.0150 g/s. On the contrary, when the pressure of the helium gas is approximately 170 kPa, the temperature of the second cooling part 120 may be considerably lower than the boiling point of the helium gas even when the mass flowrate of the helium gas reaches approximately 0.0170 g/s.

As described above, it is advantageous to raise the pressure of helium gas in raising the liquefaction rate of the helium gas, and thus, the pressure of the helium gas injected to the first cooling part 110 may be raised.

Referring again to FIG. 8, the compressor 170 may include: a first storage 172 that accommodates the helium gas supplied from the helium gas supply part 10 through the supply hose 12 and that is connected to the second hose 74; and a second storage 175 in which the first storage 172 is built and which is connected to the first hose 72 and the second hose 74. The compressor 170 may include a first mass body 174 prepared in an entrance connected to the first hose 72 in the second storage 175.

The first mass body 174 may block the entrance, which is connected to the first hose 72 of the second storage 175 by gravitational force. Until the pressure of the helium gas transferred through the first hose 72, the helium gas may not enter the second storage 175. When the pressure of the helium gas inside the first hose 72 while the first mass body 174 blocks the entrance, the first mass body 174 may be raised. At this point, the helium gas from the first hose 72 may be injected into the second storage 175 at a relatively high pressure.

Wrinkles may be formed on the lateral wall of the first storage 172. Thus, the length of the first storage 172 may vary flexibly in the vertical direction. When the first mass body 174 is raised, the length of the first storage 172 may decrease in this process.

A second mass body 176 may be prepared in the entrance where the first storage 172 is connected to the second hose 74. When helium gas in injected through the supply hose 12 or the first mass body 174 is raised, the pressure inside the first storage 172 may increase. When the pressure inside the first storage 172 increases, the helium gas having a relatively high pressure may be transferred to the second hose 74 while the second mass body 176 is raised. The heater 179 may apply heat to the supply hose 12 in order to raise the pressure of the helium gas injected through the supply hose 12.

A third mass body 178 may be prepared in the entrance where the second storage 175 is connected to the second hose 74. When the pressure inside the second storage 175 increases, the helium gas in the second storage 175 may be transferred to the second hose 74 while the third mass body 173 is raised. The helium gas inside the second storage 175 may be transferred to the second hose 74 at a relatively high pressure.

FIG. 8 exemplarily illustrates that the compressor 170 includes three mass bodies, but the embodiments are not limited thereto. For example, the compressor 170 may also include a greater number of mass bodies than three. In another example, the compressor 170 may also include two or less mass bodies. For example, the third mass body 178 may also be omitted.

Figure 11:
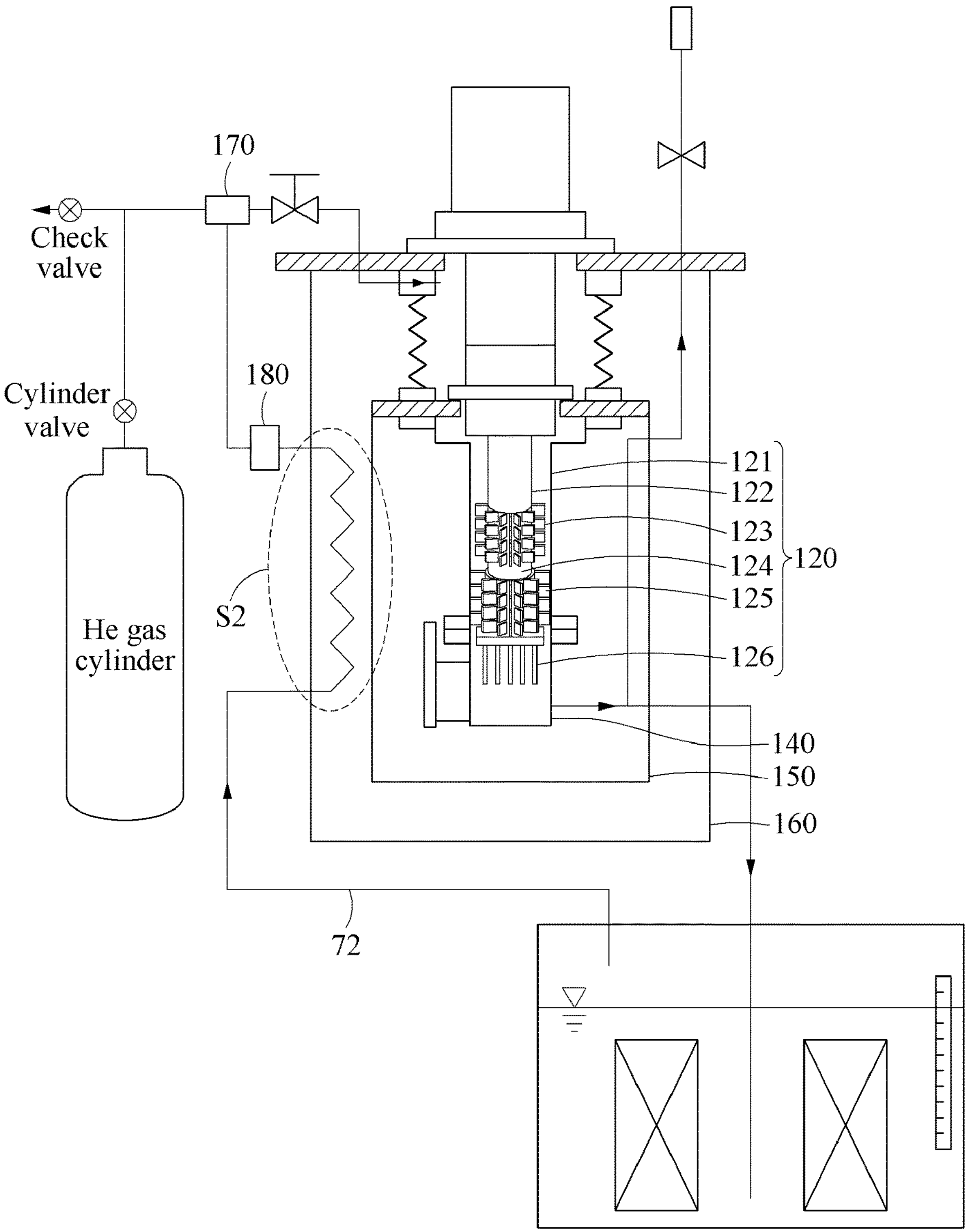
FIG. 11 is a cross-sectional view exemplarily illustrating a helium gas liquefier in accordance with another exemplary embodiment.

FIG. 11 is a cross-sectional view exemplarily illustrating a helium gas liquefier in accordance with another exemplary embodiment. In describing the embodiment of FIG. 11, the content overlapping with FIGS. 1 to 10 will be omitted.

Referring to FIG. 11, at least a portion of the first hose 72 may make contact with the surface of the radiation shield 150. As described above, the radiation shield 150 may be thermally connected to the first cooling part 110 and maintained at a temperature of the boiling point of nitrogen or lower. Thus, when a portion of the first hose 72 is brought into contact with the surface of the radiation shield 150, the gas inside the first hose 72 may be cooled by heat exchange. In this process, the phases of other gases (such as, nitrogen gas) excluding helium may be changed inside the first hose 72. In addition, the helium gas inside the first hose 72 may also be cooled in advance. Therefore, the temperature of the helium gas injected into the first cooling part 110 is lowered, and consequently, the re-liquefaction rate of the helium gas may be raised.

The first hose 72 may make contact with the surface of the radiation shield 150 in various manners. For example, a portion of the first hose 72 may be wound on the radiation shield 150. However, the embodiments are not limited thereto. For example, a portion of the first hose 72 may also be attached, in a rolled state, to the surface of the radiation shield 150.

A purifier 180 may be prepared between a region S2, in which the first hose 72 makes contact with the surface of the radiation shield 150, and the compressor 170. The purifier 180 may be connected to the first hose 72. The purifier 180 may remove impurities that pass through the first hose 72.

For example, the material the phase of which is changed is filtered by the purifier 180, and the helium gas maintained at a gas state even in a low temperature state may be selectively transferred to the compressor 170.

Figure 12:
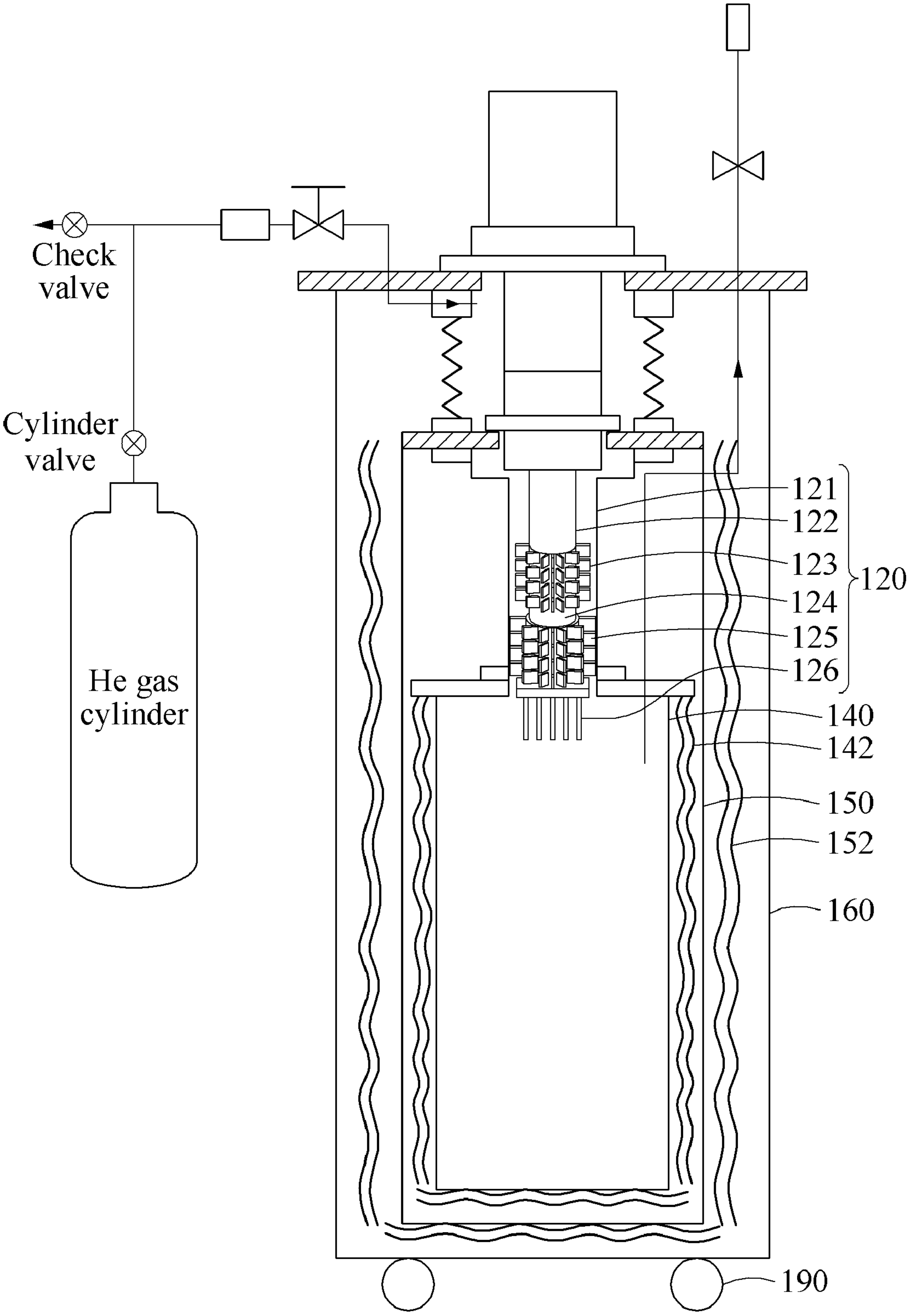
FIG. 12 is a cross-sectional view exemplarily illustrating a helium gas liquefier in accordance with another exemplary embodiment.

FIG. 12 is a cross-sectional view exemplarily illustrating a helium gas liquefier in accordance with another exemplary embodiment. In describing the embodiment of FIG. 12, the content overlapping with FIGS. 1 to 11 will be omitted.

Referring to FIG. 12, a helium gas liquefier may include: a first insulating shield body 142 disposed on a surface of a liquid helium storage 140; and a second insulating shield body 152 provided on a surface of a radiation shield 150. External heat may be prevented from being transferred to a second cooling part 120 and the liquid helium storage 140 by the first insulating shield body 142 and the second insulating shield body 152. Wheels 190 may be provided under a chamber 160. Since the wheels 190 are provided under the chamber 160, a user may easily move the helium gas liquefier.

In the above, helium gas liquefiers in accordance with exemplary embodiments have also been described with reference to FIGS. 1 to 12. Hereinafter, a method for liquefying helium gas using the helium gas liquefier.

Figure 13:
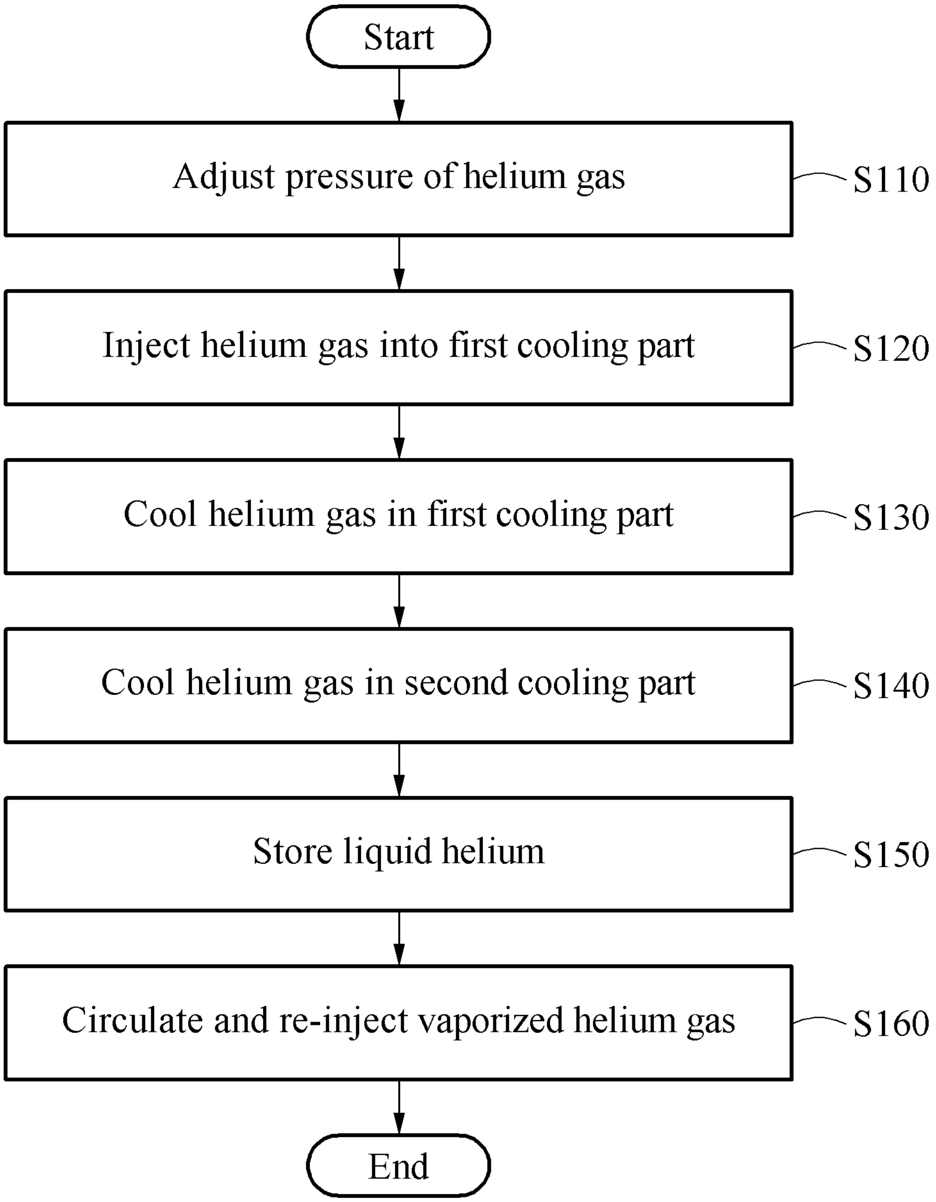
FIG. 13 is a flow diagram illustrating a method for liquefying helium gas in accordance with an exemplary embodiment.

FIG. 13 is a flow diagram illustrating a method for liquefying helium gas in accordance with an exemplary embodiment.

Referring to FIG. 13, in step S110, the pressure of the helium gas injected into a first cooling part 110 may be adjusted by using a compressor 170. The compressor 170 may adjust not only the pressure of the helium gas supplied from a helium gas supply part 10, but also the pressure of the helium gas that is circulated by a first hose 72 and recycled.

In step S120, the helium gas may be injected into the first cooling part 110 using a second hose 74.

The helium gas may be injected into a first cylinder 114. In step S130, the helium gas may be cooled by using the first cooling part 110. The helium gas may be cooled by performing heat exchange in the first cooling part 110. The helium gas may be cooled by performing heat exchange with a first cooling column 112 and a first cold head 116 in the first cooling part 110. In this process, when the gaps between the inner circumferential surface of the first cylinder, the outer circumferential surface of the first cooling column 112, and the outer circumferential surface of the first cold head 116 are set to be small, the helium gas may effectively be cooled.

In step S140, the helium gas may be cooled by using a second cooling part 120. The helium gas may effectively be cooled by making contact with fins of the second cooling part 120. The second cooling part 120 may be surrounded by the radiation shield 150 and an insulating shield body 152. Thus, the amount of heat transferred to the second cooling part 120 may decrease.

In step 150, liquid helium liquefied in the second cooling part 120 may be stored in a liquid helium storage 140. The liquid helium stored in the liquid helium storage 140 may move to an ultralow temperature cooling part 30. The ultralow temperature cooling part 30 may use liquid helium to perform a cooling function.

In step S160, the helium gas vaporized in the ultralow temperature cooling part 30 may be circulated through the first hose 72 and re-injected into the first cooling part 110. In this process, the helium gas transferred through the first hose 72 may be injected into the first cooling part 110 described in step S120 in a state of having a pressure increased by the compressor 170 described in step 110. In addition, the gas transferred through the first hose 72 may be pre-cooled in a region in which the first hose 72 and the radiation shield 150 make contact with each other. Then, impurities in the first hose 72 may be removed by a purifier 180.

Heretofore, a helium gas liquefier and a method for liquefying helium gas in accordance with exemplary embodiments with reference to FIGS. 1 to 13 have been described. According to at least one embodiment, helium gas may be liquefied by a two-stage cooling method using a first cooling part and a second cooling part. According to at least one embodiment, the liquefaction rate of helium gas may be raised due to structural characteristics of the first cooling part and the second cooling part. According to at least one embodiment, the helium gas liquefied in an ultralow temperature cooling part may be circulated and re-liquefied without external power. According to at least one embodiment, the liquefaction rate of helium gas may be raised by adjusting the pressure of the helium gas injected into the first cooling part.

Heretofore, the present disclosure has been described by characteristic features such as specific elements and limited embodiments and drawings, but these are merely provided to help overall understanding of the present disclosure, and the present disclosure in not construed to be limited by the embodiments. Those skilled in the art in the technical field belonging to the present disclosure could derive various modifications and changes from the description.

Accordingly, the inventive concept of the present disclosure should not be determined to be limited to the embodiments described above, and not only claims to be set forth but also the equivalents thereof or those having equivalent modifications should be construed to be within the scope of the inventive concept of the present invention.

Although the embodiments have been described by limited number of drawings, those skilled in the art in the relevant technical field could derive various modifications and changes on the basis of the above description. For example, although the described features are implemented in a different order than that in the described method and/or elements such as systems, devices and circuits are coupled or combined in a different form from that in the described method, or substituted or replaced by other elements or equivalents, suitable results may be achieved.

What is claimed is:

1. A helium gas liquefier comprising:

a first cooling part comprising a first cooling column, a first cold head installed on the first cooling column, and a first cylinder in which the first cooling column and the first cold head are built;

a second cooling part comprising a second cooling column, a second cold head installed on the second cooling column, and a second cylinder in which the second cooling column and the second cold head are built;

a liquid helium storage disposed under the second cooling part;

an ultralow temperature cooling part disposed under the liquid helium storage and configured to receive liquid helium stored in the liquid helium storage and perform a cooling function;

a first hose transferring a helium gas vaporized in the ultralow temperature cooling part;

a compressor configured to increase a pressure of a helium gas wherein the helium gas comprises a helium gas transferred through a supply hose from a helium gas supply part and the helium gas transferred through the first hose; and a second hose connected to the compressor and configured to cause the helium gas discharged from the compressor to be injected into the first cylinder, wherein the compressor is connected to the first hose, wherein a plurality of radially formed fins are formed on an outer circumferential surface of at least one among the second cooling column and the second cold head, wherein the compressor comprises:

a first storage configured to accommodate the helium gas supplied from the helium gas supply part and connected to the second hose; and a second storage in which the first storage is built and which is connected to the first hose and to the second hose;

a first mass body provided in an entrance where the second storage is connected to the first hose, a second mass body provided in an entrance where the first storage is connected to the second hose, and a third mass body provided in an entrance where the second storage is connected to the second hose, wherein the first mass body is connected to the bottom of the first storage, and when the first mass body is raised, a length of the first storage decreases.

2. The helium gas liquefier of claim 1, further comprising a plurality of fins formed on a surface of the second cold head toward the liquid helium storage from the second cold head.

3. The helium gas liquefier of claim 1, wherein the first cylinder comprises wrinkles on a surface thereof and is flexible in a lengthwise direction thereof.

4. The helium gas liquefier of claim 1, further comprising a flange configured to connect the first cold head and the second cooling column, wherein the flange comprises therein a pass hole through which a helium gas passes, and the pass hole is formed in a position adjacent to an edge of the first cold head.

5. The helium gas liquefier of claim 1, further comprising:

a radiation shield configured to accommodate the second cooling part and the liquid helium storage; and a chamber configured to accommodate the first cooling part and the radiation shield.

6. The helium gas liquefier of claim 1, wherein an ultralow temperature is lower than approximately 4.2 K.

* * * * *